(12) United States Patent
Wakayama et al.

(10) Patent No.: US 10,097,258 B1
(45) Date of Patent: Oct. 9, 2018

(54) ENERGY-COGNIZANT SCHEDULING OF STORE-AND-FORWARD COMMUNICATIONS WITH MULTIPLE PRIORITY LEVELS IN SATELLITE SYSTEMS

(71) Applicant: SPAWAR Systems Center Pacific, San Diego, CA (US)

(72) Inventors: Cherry Y. Wakayama, San Diego, CA (US); Peter J. Yoo, San Diego, CA (US); Zelda B. Zabinsky, Seattle, WA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 84 days.

(21) Appl. No.: 15/480,634

(22) Filed: Apr. 6, 2017

(51) Int. Cl.
*H04B 7/185* (2006.01)
*H04W 72/10* (2009.01)
*H02J 7/35* (2006.01)

(52) U.S. Cl.
CPC ..... *H04B 7/18513* (2013.01); *H04B 7/18519* (2013.01); *H04W 72/10* (2013.01); *H02J 7/35* (2013.01)

(58) Field of Classification Search
CPC ........... H04B 7/18519; H04B 7/18513; H04W 72/10; H02J 7/35
See application file for complete search history.

(56) References Cited

U.S. PATENT DOCUMENTS

| 2015/0318916 A1* | 11/2015 | Gopal | H04B 7/18519 455/13.1 |
| 2017/0310382 A1* | 10/2017 | Darby | H04B 7/18517 |
| 2018/0034536 A1* | 2/2018 | Trutna | H04B 7/18519 |

OTHER PUBLICATIONS

E. Buchen, "Spaceworks' 2014 Nano/Micro-satellite Market Assessment," Proceedings of the 28th Annual AIAA/USU Conference on Small Satellites, Logan, UT, 2014, SSC14-I-3.
M.L. Pinedo, Scheduling—Theory, Algorithms, and Systems, fourth edition, Springer, p. 36, 2012.
M.E. Dyer and L.A. Wolsey, "Formulating the single machine sequencing problem with release dates as a mixed integer program," Discrete Applied Mathematics, vol. 26, pp. 255-270, 1990.

(Continued)

*Primary Examiner* — Hashim S Bhatti
(74) *Attorney, Agent, or Firm* — SPAWAR Systems Center Pacific; Kyle Eppele (57) ABSTRACT

Delivery of a plurality of messages by a satellite is scheduled taking energy into account. An amount of time needed to deliver each of the plurality of messages received from a plurality of ground sources and intended for a plurality of ground recipients at respective different destinations is estimated based on the size of each of the messages. Each different destination has an associated contact time window during which the satellite will be in range of the ground recipients at that destination. An amount of energy that will be available from a power source for delivering the messages during each contact window is determined. Delivery of the plurality of messages to the ground recipients is scheduled such that a total time for delivery of the messages is minimized.

20 Claims, 10 Drawing Sheets

(56) References Cited

OTHER PUBLICATIONS

L.A. Hall, A.S. Schulz, D.B. Shmoys and J. Wein, "Scheduling to Minimize Average Completion Time: Off-line and On-line Approximation Algorithms," Mathematics of Operations Research. vol. 22, pp. 513-544, 1997.

M.X. Goemans, M. Queyranne, A.S. Schulz, M. Skutella and Y. Wang, "Single Machine Scheduling with Release Dates," SIAM Journal on Discrete Mathematics, vol. 15, No. 2, pp. 165-192, 2002.

N. Megrow and A.S. Schulz, "On-line Scheduling to Minimize Average Completion Time Revisited," Operations Research Letters, vol. 32, pp. 485-490, 2004.

J. Castaing, A. Cohn and J. Cutler, "Scheduling Downloads for Multi-Satellite, Multi-Ground Station Missions," Proceedings of the 28th Annual AIAA/USU Conference on Small Satellites, Logan, UT, 2014,SSC14-VIII-4.

J.C. Pemberton and L.G. Greenwald, "On the Need for Dynamic Scheduling of Imaging Satellites," International Archives of Photogrammetry Remote Sensing and Spatial Information Sciences, vol. 34, issue 1, pp. 165-171, 2002.

H.J. Li, Y. Lu, F.H. Dong, and R. Liu, "Communications Satellite Multi-Satellite Multi-Task Scheduling," Procedia Engineering, vol. 29, pp. 3143-3148, 2012.

L. Barbulescu, J.P. Watson, L.D. Whitley and A.E. Howe, "Scheduling Space-Ground Communications for the Air Force Satellite Control Network," Journal of Scheduling, vol. 7, issue 1, pp. 7-34, 2004.

A.C. Fu, E. Mondiano and J.N. Tsitsiklis, "Optimal Energy Allocation and Admission Control for Communications Satellites," IEEE/ACM Transactions on Network, vol. 11, issue 3, pp. 488-500, 2003.

W.E. Smith, "Various Optimizers for Single-Stage Production," Naval Research Logistics Quarterly, vol. 3, pp. 59-66, 1956.

J.K. Lenstra, A.H.G. Rinnooy Kan and P. Brucker, "Complexity of Machine Scheduling Problems," Annals of Discrete Mathematics, vol. 1, pp. 343-362, 1977.

F.S. Hillier and G.J. Lieberman, Introduction to Operations Research, McGraw-Hill, tenth edition, pp. 474-533, 2013.

LP_Solve 2015, "LP_Solve Reference Guide Menu." http://lpsolve.sourceforge.net. (Accessed Feb. 1, 2015.)

C. Y. Wakayama, P. J. Yoo, and Z B. Zabinsky, "Energy-Cognizant Scheduling of Store-and-Forward Communications with Multiple Priority Levels in Nanosatellite Systems," presented at 13th Annual CubeSat Developers' Workshop, Apr. 21, 2016.

C. Y. Wakayama, P. J. Yoo, and Z B. Zabinsky, "Energy-Cognizant Scheduling of Store-and-Forward Communications with Multiple Priority Levels in Nanosatellite Systems," 30th Annual AIAA/USU Conference on Small Satellites, Logal, UT, Aug. 2016, SSC16-P2-03.

\* cited by examiner

ENERGY-COGNIZANT SCHEDULING OF STORE-AND-FORWARD COMMUNICATIONS WITH MULTIPLE PRIORITY LEVELS IN SATELLITE SYSTEMS

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 104403.

FIELD OF THE INVENTION

The present invention pertains generally to scheduling of message delivery. More particularly, the present invention pertains to scheduling of message delivery by a satellite.

BACKGROUND OF THE INVENTION

There exist many satellite communication systems that provide communication and networking services to defense, public, and commercial users. However, many of the existing communication systems rely on large satellites, where energy availability for message transmission is not a critical constraint.

With advances in technology, low-cost smaller satellites are finding new applications for defense, public and commercial services. These smaller satellites are typically low earth orbiting satellites (orbital altitude generally between 100 and 1200 miles) and may be particularly useful in providing network connectivity in remote and hard-to-reach areas on Earth. These satellites may also serve as message "ferries" to relay messages between ground stations and user devices in remote locations that have limited satellite coverage.

In addition to their function or mission, satellites are often characterized by size or more specifically with respect to their mass. Various categories of satellites ranging from large satellites having a mass in excess of 1,000 kilograms to femto satellites having a mass less than 0.1 kilogram are currently recognized today by the industry. For purposes of explanation only the remainder of this specification will utilize the term nanosat or nanosatellite to illustrate the teachings of this innovation. However, it should be noted the innovation is equally applicable to all other small satellite categories including Mini, Micro, Pico and Femto satellites, as well as medium and large mass satellites.

As each nanosat passes over ground stations and remote user devices, decisions need to be made as to which message(s) to deliver. Since nanosats orbit close to the earth, they have short contact time windows with a particular ground station or a remote user device. In addition, depending on the orientations of the satellites with respect to the sun, they may have short charging time windows between message deliveries at two different destinations during which their solar panels can be charged to provide power for relaying messages. Also, due to their size, nanosats have battery capacity limitations. Thus, with nanosatellites, energy management is a critical issue for message delivery scheduling.

Various scheduling schemes for satellites and ground stations have been proposed, some of which take into account energy management, and some of which do not. Each of these schemes addresses a unique aspect of scheduling based on a particular application.

For example, in one approach, multiple communication tasks from ground stations to multiple satellites are scheduled with the objective of maximizing the total weight of task priorities to meet available satellite resources (number of transponders, bandwidth, power, support for different service types, etc.). According to yet another approach, a communication task represents a point-to-point connection between a ground station and a satellite, and the communication task is characterized by its bandwidth demand, power need, time requirement, service type and priority. A similar scheduling scheme minimizes the number of unscheduled tasks. These approaches do not consider satellite energy storage capacity or battery charging dynamics.

Another approach schedules downloads from imaging satellites to a multi-ground station network with the objective of maximizing the total amount of data downloaded under energy and data dynamical constraints. Although this approach considers energy constraints, the approach is intended for imaging and data collection applications.

In all the approaches mentioned above, scheduling is performed by a centralized ground control system, in which operators pre-calculate a sequence of messages to be delivered, resulting in static data collection and delivery schedules. For routine messages that are planned, a centralized scheduling method may be satisfactory. However, for nanosats, which must store messages received from remote devices or ground stations and wait until a nanosat-to-ground contact time window with the intended recipient to deliver the message, a centralized scheme adds delay and transmission overheads and reduces flexibility.

A dynamic programming approach has been proposed to address energy limitations for optimizing energy allocation and admission control for communications satellites. According to this approach, a threshold-based optimal policy is derived for a single energy-constrained satellite to select which requests to serve. While this approach does not rely on a centralized ground control system, it does not address the difficulties involved in a nanosat delivering messages to different destinations during nanosat-to-ground contact time windows.

In view of the above, there is a need for a dynamic, decentralized onboard nanosat message delivery scheme in which each nanosat becomes a decision maker and determines its own message delivery scheduling policy, taking into account energy constraints.

SUMMARY OF THE INVENTION

According to an illustrative embodiment, methods and devices are provided for scheduling delivery of a plurality of messages by a satellite. An amount of time needed to deliver each of the plurality of messages received from a plurality of ground sources and intended for a plurality of ground recipients at different respective destinations is estimated based on the size of each of the messages. Each of the different respective destinations has an associated contact time window during which the satellite will be in range of the ground recipients at that destination. An amount of energy that will be available from a power source for delivering the messages during each contact time window is determined. Delivery of the plurality of messages to the ground recipients is scheduled based on the amount of energy that will be available for delivery of the messages during each contact time window and the amount of time needed to deliver each of the messages, such that a total time for delivery of the messages is minimized.

These, as well as other objects, features and benefits will now become clear from a review of the following detailed description, the illustrative embodiments, and the accompanying drawings.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

According to illustrative embodiments, an autonomous scheduling scheme is provided for low earth orbiting store-and-forward communications nanosatellites (nanosats). This scheduling scheme takes into account message size, power required for message transmission, power available during charging time windows, onboard data storage, energy capacity, contact time windows and message priority in a manner which minimizes a total time for message delivery.

Figure 1A:
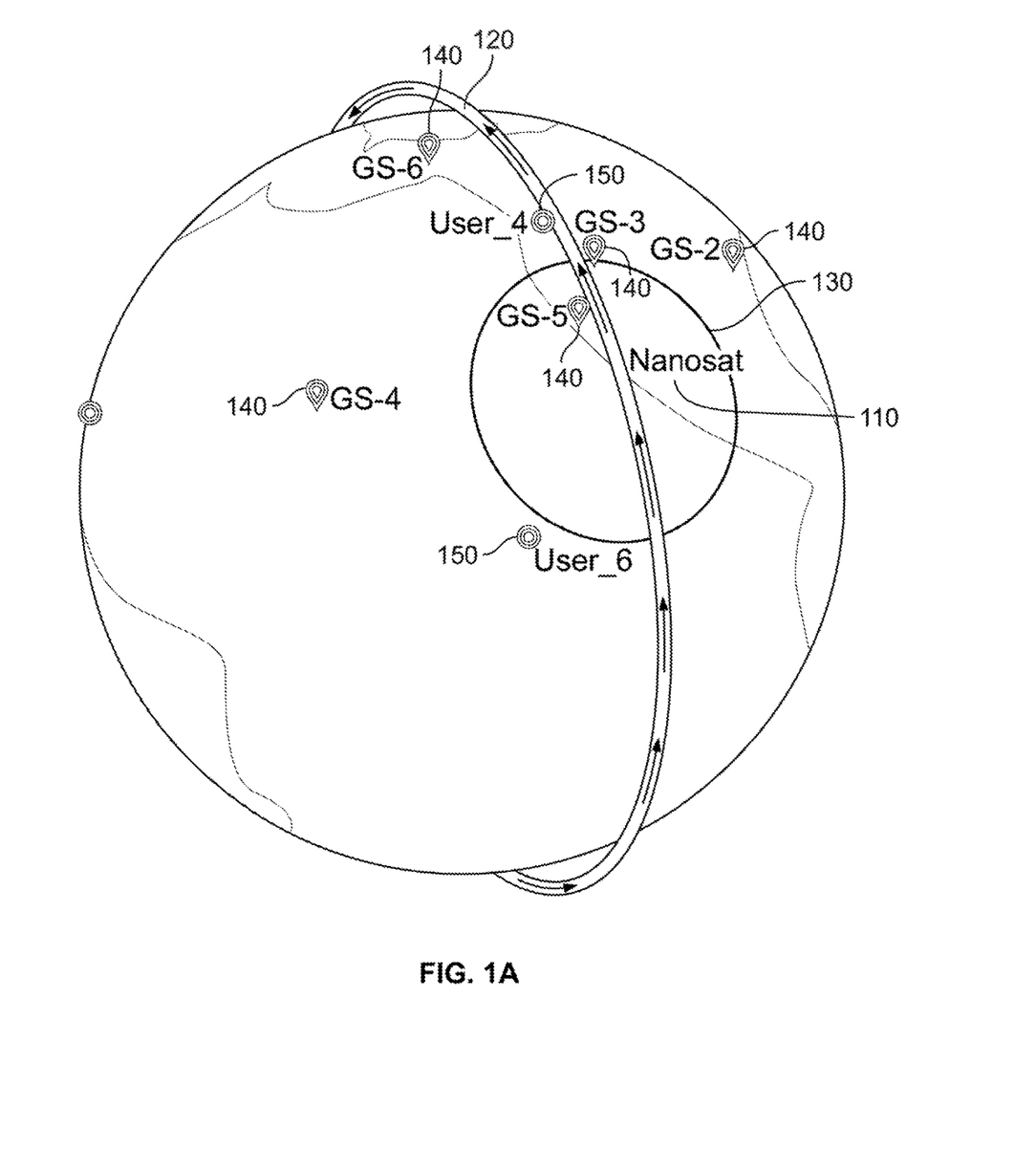
FIG. 1A illustrates a nanosat message ferry relaying messages between ground stations and remote user devices in which energy-cognizant message delivery scheduling may be implemented according to illustrative embodiments.

To aid in understanding of the invention, a nanosat acting as a message ferry is illustrated in FIG. 1A. As shown in FIG. 1A, a nanosat 110 orbits the earth in a path 120. The nanosat 110 has a footprint 130 which represents the radio signal transmit/receive range of the nanosat at a given time. As the nanosat 110 orbits the Earth, it passes over different ground stations 140 and remote user devices 150 at different destinations. The nanosat receives messages of different sizes and different priorities from and transmits such messages to the ground stations 140 and the remote user devices 150 within its footprint. Thus, the nanosat 110 acts as a message ferry between the ground stations 140 and the remote user devices 150. It is assumed that a satellite orbit propagator tool is available to the ground stations 140, the remote user devices 150, and the nanosat 110, such that each device knows the satellite's footprint and the geographic locations of the ground destinations.

In the example shown in FIG. 1A, the nanosat's footprint 130 is over the ground station GS-5. Thus, the nanosat 110 is able to receive messages from and transmit messages to the ground station GS-5. Assuming, for illustrative purposes, that the nanosat moves in the direction shown by the arrows on the orbital path 120, the footprint 130 will move to cover the ground station GS-3 and the remote user device User_4, such that the nanosat 110 will be able to transmit and receive messages to and from the ground station GS-3 and the remote user device User_4. As the nanosat 110 continues to move, the footprint 130 will continue cover different remote user devices and ground stations and thus be able to transmit and receive messages to and from different ground stations and remote user devices, such as the ground station GS-6 and the remote user device User-6. Although not shown, it should be appreciated that the there are other ground stations (e.g., GS-1) and other remote user devices (e.g., User_1, User_2, User_3, and User_5) that the nanosat 110 may pass over as it orbits the Earth. However, some ground stations and remote user devices, such as the ground station GS-4 and the ground station GS-2, may not fall under the footprint 130 of the nanosat. These ground stations and remote user devices may be better served by other nanosats having different orbital paths.

Figure 1B:
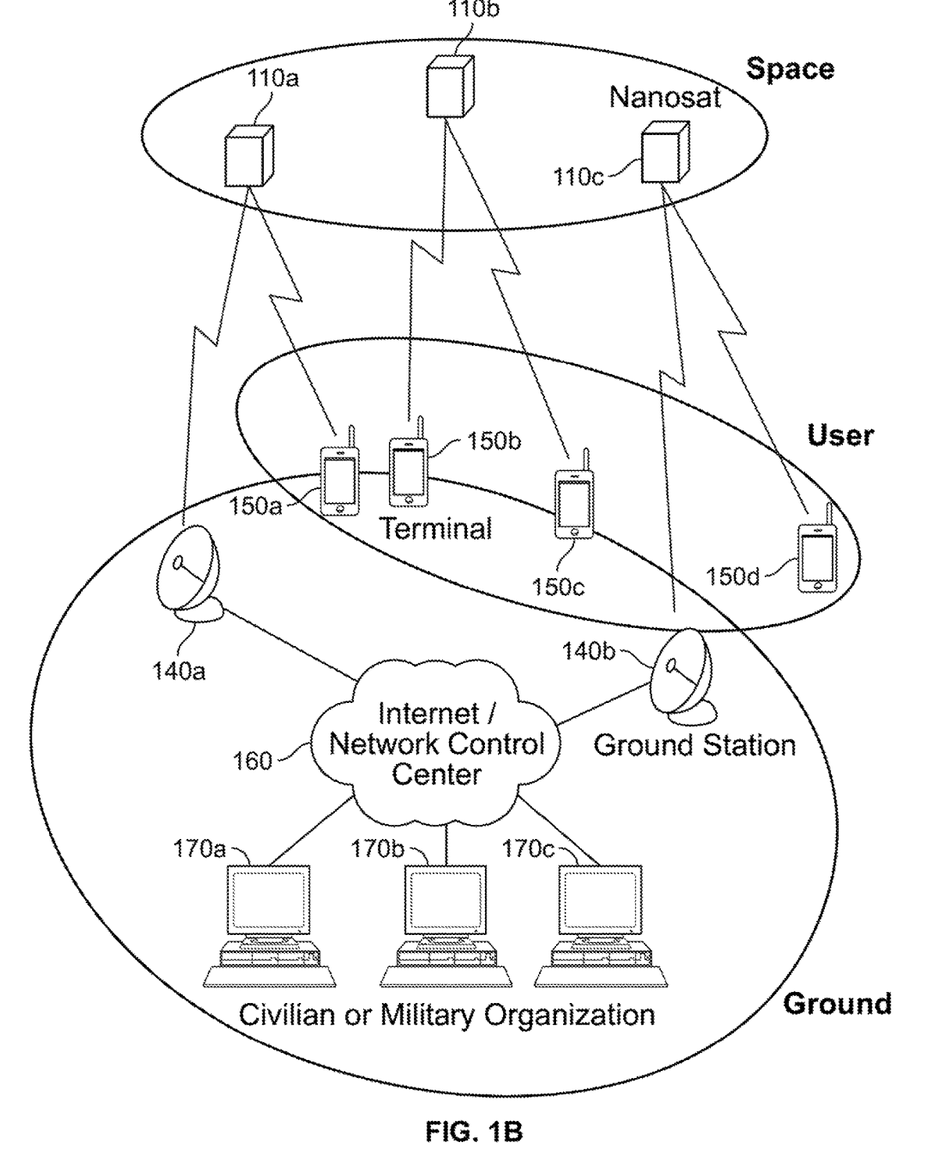
FIG. 1B illustrates a store-and-forward communication system employing nanosats in which energy-cognizant scheduling may be implemented according to illustrative embodiments.

FIG. 1B illustrates an extended communication network in which a nanosat according to illustrative embodiments may be implemented. In this system, multiple nanosats 110a, 110b, and 110c each have their own orbital paths and thus have footprints that cover different ground stations and remote user devices at different times. As shown in FIG. 1B, the nanosat 110a passes over the ground station 140a and the remote user device 150a, allowing messages to be relayed between the ground station 140a and the remote user device 150a. Nanosat 110b passes over the remote user devices 150b and 150c, allowing messages to be transmitted to and received from these devices. Though nanosat 110b is not in contact with a ground station and thus cannot relay a message from a remote user device to a ground station, the nanosat 110c passes over the remote user device 150c and the ground station 140b. Thus, messages may be relayed from the remote user device 150c to the ground station 140b via the nanosat 110c. The nanosat 110c also passes over the remote user device 150d, allowing messages to be relayed between the remote user device 150d and the ground station 140b.

The ground stations 140a and 140b may, in turn be connected via, e.g., the Internet 160, to computers or servers 170a, 170b, and 170c. The computers 170a, 170b, and 170c may generate messages to be transmitted to the remote user devices via the ground stations and/or interpret messages received from the remote user devices via the ground stations.

In the architecture shown in FIG. 1B, there is no cross-linking between nanosats 110a, 110b and 110c. Therefore, there is no instantaneous end-to-end connection between network users. Nevertheless, connectivity between these users can be achieved with a store-and-forward approach, in which each nanosat stores a received message until it is within range of an intended ground recipient device.

Figure 11:
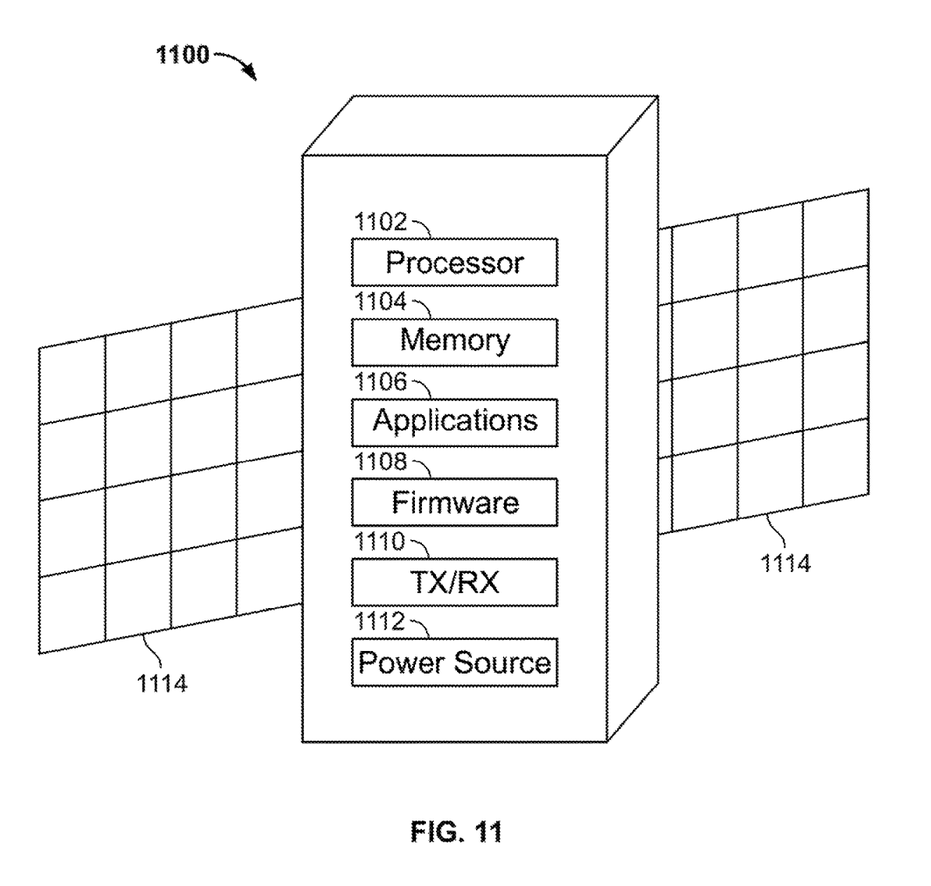
FIG. 11 illustrates a nanosatellite in which a message delivery scheme may be employed according to illustrative embodiments.

As a nanosat—such as those depicted in FIGS. 1A and 1B—passes over a message destination, the nanosat decides whether there is sufficient time and sufficient energy to deliver an entire message or only part of a message to the message destination. According to illustrative embodiments, this decision is made autonomously by the nanosat. The nanosat's decision is based on the size of the message, an amount of energy that will be available from a power source for delivering the messages during the contact window associated with the destination, and the amount of time needed to deliver the message. Additionally, the nanosat may choose to delay a delivery to the message destination to save energy for a higher priority message associated with a different destination. The goal is to minimize the total delivery time of messages weighted by their priorities. This tradeoff is further complicated by the limitation of the nanosat battery storage capacity and the solar charging opportunity as the nanosat orbits the earth. An example of a nanosat in which the autonomous scheduling scheme may be employed is shown in FIG. 11 and described in detail below.

For the purposes of this disclosure, it is assumed that nanosats operate in a full-duplex mode, and the transmit power is much higher than the receive power. Therefore, in the following, only message transmission from the nanosats is considered.

In the description that follows, the formulation of a binary integer program (BIP) to optimize a single-satellite resource-constrained message delivery schedule is first explored. Since a large-scale binary integer program is computationally intensive, an approximation algorithm is then explored, based on a time-indexed formulation and mean busy time objective function for finding quality solutions efficiently. The performance of the approximation algorithm is then compared with greedy strategies based on priorities and priority to message size ratios.

The binary integer linear program is formulated to minimize the sum of the priority weighted delivery completion time for an offline version of the message delivery scheduling problem for a single nanosat. In the offline version, complete information about messages to be delivered (number of messages, sizes, priorities, destinations) is known in advance. A real-world scheduling problem is a dynamic system where nanosats receive new delivery requests which requires online message scheduling. Nevertheless, the offline model provides good insights and serves as a building block for autonomous distributed scheduling.

The single-satellite priority-weighted message delivery scheduling problem belongs to a class of single-machine weighted completion time scheduling problems. A basic single-machine weighted completion time scheduling problem is stated as follows. A set of n jobs is to be processed on a single machine, which processes at most one job at a time. Each job j has a processing time, $p_j > 0$ and a non-negative weight, $w_j \geq 0$. The objective is to find a schedule that minimizes the weighted sum of job completion times $\Sigma_{j=1}^{n} w_j C_j$, where $C_j$ represents the completion time of the job j.

In this basic form, the problem can be solved using Smith's rule, which sequences the jobs in non-increasing order of the ratios $w_j/p_j$. When each job j has a release time, $r_j \geq 0$, the scheduling problem is computationally difficult both preemptive and non-preemptive machine environments. For the basic single-machine scheduling problem described above, $r_j = 0$ for $j = 1, \ldots, n$.

In the preemptive environment, the processing of a job may be suspended to process a different job and resumed later. In the non-preemptive environment, the processing of a job cannot be interrupted by a different job until its completion. As preemption is allowed in satellite message delivery scheduling, approximation methods must be used to solve the message delivery scheduling problem.

For satellite message delivery scheduling, contact time windows with destinations impose a release time constraint on each message. In addition, the message delivery schedule must satisfy the satellite's dynamic energy constraints in order to comply with its limited energy capacity.

According to illustrative embodiments, a single-satellite resource-constrained message delivery scheduling scheme is provided that uses an optimization model. The nanosat scheduling optimization model in the offline version assumes that each nanosat has a list of J messages indexed by $j=1, \ldots, J$. The priority and size of each message are denoted by $w_j$ and $s_j$, respectively, for $j=1, \ldots, J$. Each message is to be delivered to a destination $d_j$, during the associated contact time windows. The duration and frequency of associated contact time windows are determined by the satellite orbital parameters (e.g., altitude) and the locations of the destinations. Typically, a contact time window duration lasts an average of about five minutes.

Figure 2:
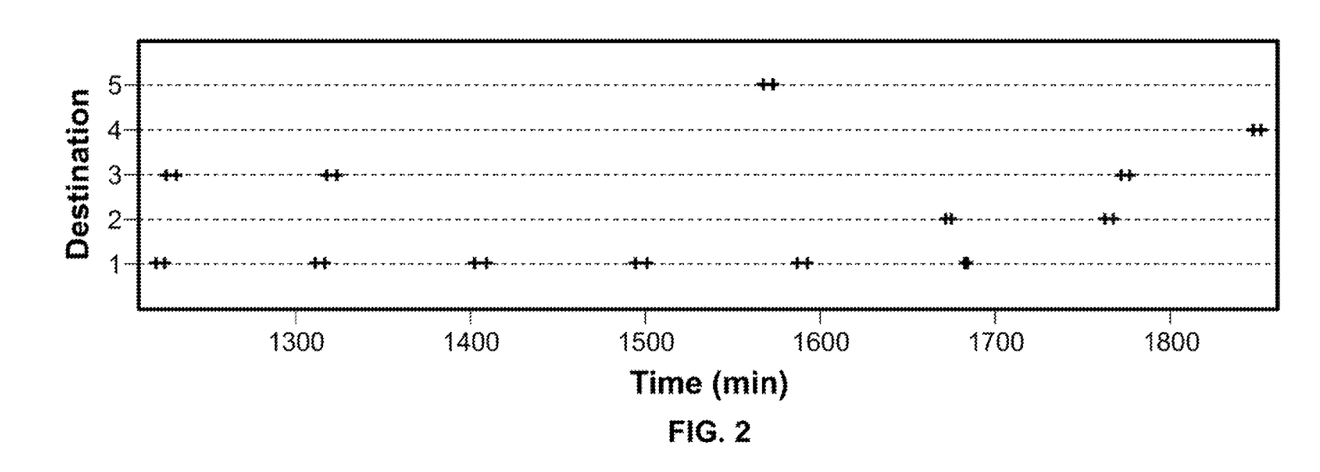
FIG. 2 illustrates examples of contact time windows for different destinations for a particular nanosatellite orbit according to illustrative embodiments.

FIG. 2 shows an example of the contact time windows for five destinations for a particular nanosat orbit. In the example shown in FIG. 2, destination 1 has several contact windows occurring approximately every 100 minutes, while destinations 2 and 3 have fewer contact windows with different spacing in between, and destinations 4 and 5 only have one contact window within the time frame shown in FIG. 2. When the nanosat transmits a message during a contact window, it consumes energy. Energy is only regained during a solar charging time window.

Figure 3:
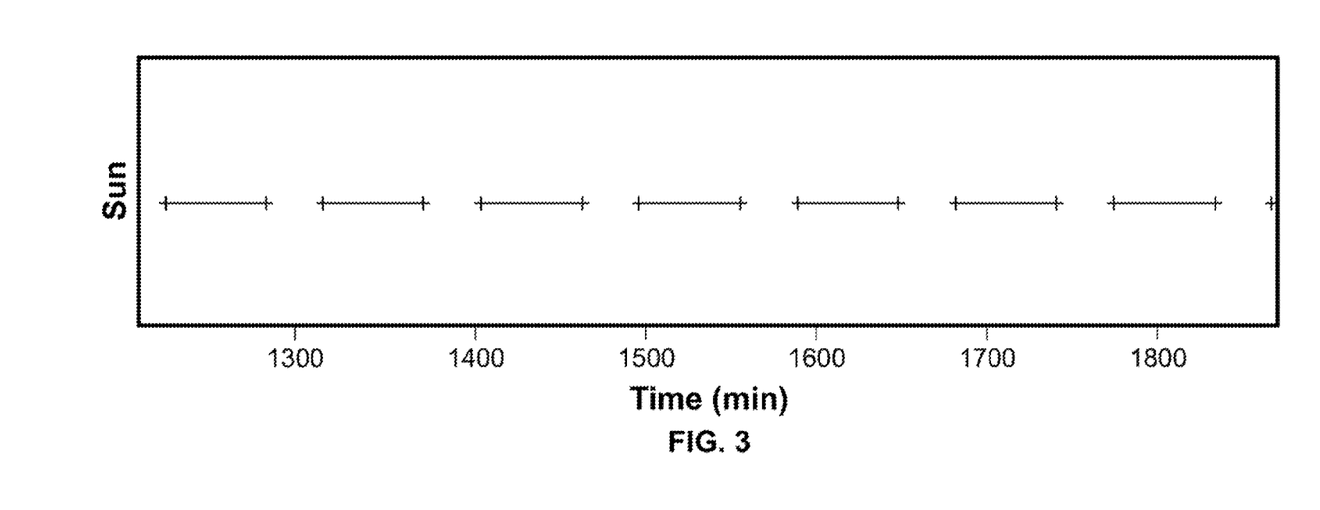
FIG. 3 illustrates examples of solar charging time windows of a particular nanosatellite according to illustrative embodiments.

FIG. 3 shows an example of solar charging time windows during which the nanosat faces the sun directly. As shown in FIG. 3, the solar charging time windows occur at regular intervals. During the solar charging time windows, solar panels on the nanosat harvest energy from the sun. This energy is provided to a power source, such as a battery, for storing energy for use during the dark portions of the orbits. The amount of charging depends on the sun exposure. The battery has a limited capacity so it may not be able to store all of the harvested energy from the sun.

The optimization models described herein provide a message delivery schedule that minimizes message delivery times weighted by their priorities. The decisions are mindful of the nanosat's contact time windows with destinations and the solar charging time windows to deliver messages of different sizes.

Figure 4:
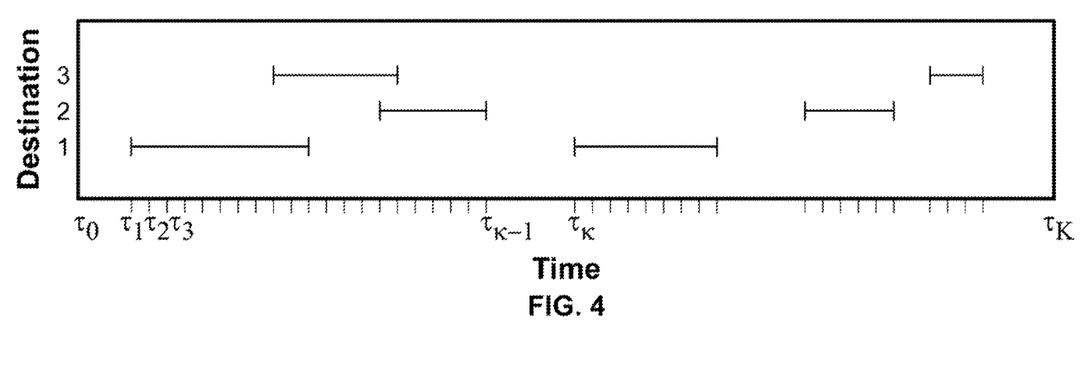
FIG. 4 illustrates time window discretization and indexing according to illustrative embodiments.

To represent contact time windows in the optimization models, the time horizon $[\tau_0, \tau_K]$ is discretized into variable length intervals indexed by $k=0, \ldots, K$. Here $\tau_K$ represents an upper bound on the time to deliver all J messages. Intervals are of unit lengths during contact time windows, and variable lengths when no contact with a destination is possible. This is illustrated in FIG. 4 which shows time window discretization and indexing according to an illustrative embodiment. In FIG. 4, one unit-length interval represents the time it takes to transmit one unit of message (e.g., 100 kilobytes of message).

Thus, for example, as shown in FIG. 4, the time interval $[\tau_1, \tau_{k-1}]$, which represents a contact window with destinations 1, 2, and 3 is divided into discrete unit-length time intervals, and messages are transmitted one unit at a time, with one unit of message being transmitted in a unit-length time interval. On the other hand, time intervals during which no contact with the destinations occurs, such as time interval [$\tau_{k-1,k}$], is not discretized into unit-length time intervals. Rather such time intervals may be of variable lengths.

A primary decision in message delivery scheduling is whether to transmit one unit of message during each unit-length interval in the possible contact time windows. The possible contact time windows for each message depend on the destination associated with the message. Since the specifics of messages, including their destinations and sizes, are assumed known, the number of primary decision variables and their associations to particular unit-length intervals can be pre-determined.

The input parameters used in the optimization models described herein include:
- $\delta_k$=energy harvested over time interval [$T_{k,+1}$] for k=0, . . . , K−1
- $w_j$=priority of message j for j=1, . . . ,
- $s_j$=size of message j for j=1, . . . ,
- $e_0$=remaining energy at $\tau_0$
- $e_{min}$=minimum energy level that must be maintained at the power source
- $e_{max}$=maximum stored energy.

The energy and size parameters are normalized to unit-length interval message units assuming a constant message transmission rate and a constant charging rate. For example, message j is discretized into 10 units ($s_j$=10), and energy gained during time interval [$\tau_k$,+1] is 7 message units ($\delta_k$=7). It is also assumed that the energy parameters and message sizes are rounded to be integers.

The decision variables used in the optimization models include $u_{jk}$=1, if message j is delivered to destination $d_j$ in interval [$\tau_{k,+1}$] for j=1, . . . , J, k=0, . . . , K−1. Otherwise, $u_{jk}$=0. That is, $u_{jk}$ is set to 0 during time interval [$\tau_{k,+1}$] if there is no contact possible with destination $d_j$. The decision variables also include:
- $e_k$=remaining energy at time $T_k$ for k=1, . . . , K
- $h_k$=intermediate variable to capture spilled energy or extra energy not needed
  for message delivery for k=0, . . . , K
- $C_j$=delivery completion time of message j for j=1, . . . , .

First Optimization Model (P1)

The first optimization model is a binary integer program (BIP) that minimizes priority weighted delivery completion time as follows.
(P1)
min
subject to $\sum_{j=1}^{J} w_j C_j$ (1)

$C_j \geq \tau_{k+1} u_{jk}$ for j=1, . . . ,k=0, . . . ,K−1 (2)

$\sum_{j=1}^{J} u_{jk} \leq 1$ for k=0, . . . ,K−1 (3)

$\sum_{k=0}^{K-1} u_{jk} = s_j$, for j=1, . . . , (4)

$e_{k+1} = e_k + \delta_k - \sum_{j=1}^{J} u_{jk} - h_k$ for k=0, . . . ,−1 and $e_0$ is given (5)

$e_{min} \leq e_k \leq e_{max}$ for k=0, . . . , (6)

$h_k \geq 0$ for k=0, . . . ,−1 (7)

$C_j \geq 0$ for j=0, . . . , (8)

$u_{jk}=\{0,1\}$ for j=1, . . . ,J,k=0, . . . ,K−1 (9)

The objective function in (1) minimizes the sum of weighted completion times which are determined through constraint (2). Constraint (3) ensures that at most one unit of message is delivered in any time interval, and constraint (4) guarantees complete message delivery. Constraint (5) models the energy dynamic at each time interval, incorporating additional energy units through solar charging and depleting energy through unit delivery. The variable $h_j$ in constraint (5) acts as an intermediate variable to work in conjunction with constraint (6) which specify upper and lower bounds on energy storage limitations of the battery. Constraints (7) and (8) are non-negativity constraint, and constraint (9) ensures binary values for $u_{jk}$.

The computation time to solve (P1) directly as a binary linear program can be prohibitively expensive for practical large-scale problems. According to another aspect of the invention, the objective function of (P1) is modified using the mean busy time of a message to create an approximation model (P2), described in further detail below.

The mean busy time $M_j$ function of message j is defined as the average point in time at which message j is delivered. Using the (discretized) time-indexed notation, the mean busy time is computed as:

$$M_j = \sum_{k=0}^{K-1} \frac{1}{s_j}\left(\tau_k + \frac{1}{2}\right) u_{jk}$$ (10)

Figure 5:
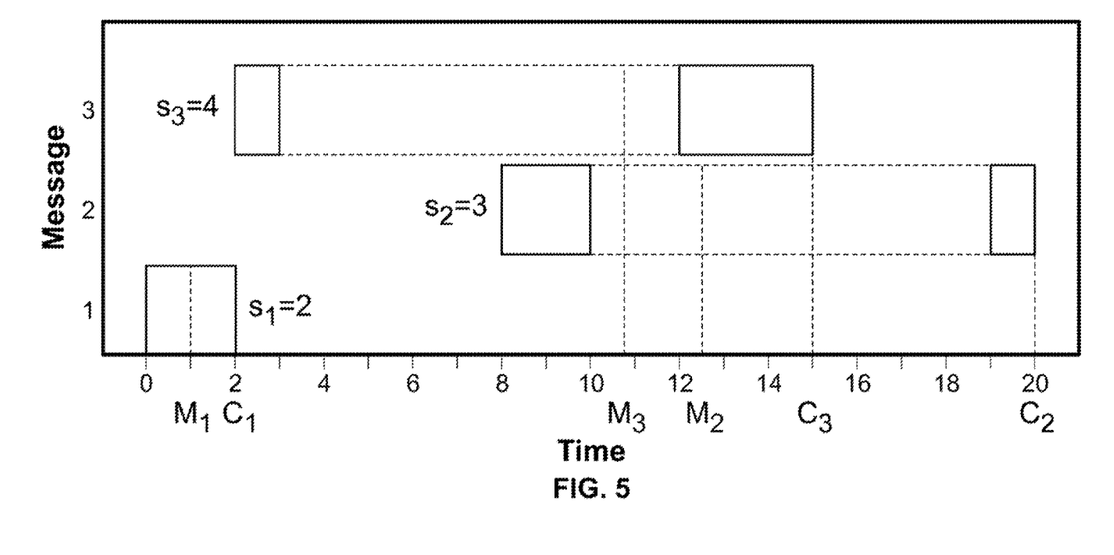
FIG. 5 illustrates examples of mean busy times for scheduled delivery of messages of different sizes according to illustrative embodiments.

FIG. 5 illustrates an example of mean busy times for three messages with different sizes and delivery schedules. It has been shown that the completion time $C_j$ for delivering a message j is a function of the mean or average point in time $M_j$ for delivery of the message j and the size $s_j$ of the message j. That is $C_j \geq M_j + s_j/2$, which holds at equality when there is no preemption. In the example shown in FIG. 5, $C_j = M_j + s_j/2$ for j=1 represents the relation of the completion time $C_1$ for delivering message 1 to the mean busy time $M_1$ and the size $s_1$ of message 1. Also, $C_j > M_j + s_j/2$ for j=2 and 3 represents the relation of the completion times $C_2$ and $C_3$ for delivering messages 2 and 3 to the mean busy times $M_2$ and $M_3$ and the sizes $s_2$ and $s_3$ of messages 2 and 3, respectively. In the example shown in FIG. 5, message 1, which has a size of 2 units, is scheduled for delivery during one contact window with no interruption and thus has a completion time equivalent to the sum of the mean busy time and the delivery time for half of the message size. On the other hand, messages 2 and 3, which have sizes of 3 and 4 units, respectively, are scheduled for delivery over two contact windows and thus each of the completion times is strictly larger than the sum of their mean busy time and the delivery time for half of the message size.

The optimization model (P1) may be reformulated by replacing the completion times with the mean busy time approximation to the completion times in the objective function to obtain the optimization model (P2) as follows. The constant terms $s_j/2$ may be dropped in (P2) without the loss of generality.

Second Optimization Model (P2)

(P2) (11)

$$\min \sum_{j=1}^{J} \sum_{k=0}^{K-1} \frac{w_j}{s_j}\left(\tau_k + \frac{1}{2}\right) u_{jk}$$

subject to $$\sum_{j=1}^{J} u_{jk} \leq 1 \text{ for } k = 0, ..., K-1$$ (12)

-continued $$\sum_{k=0}^{K-1} u_{jk} = s_j, \text{ for } j = 1, \dots, \quad (13)$$

$$e_{k+1} = e_k + \delta_k - \sum_{j=1}^{J} u_{jk} - h_k \text{ for } k = 0, \dots, -1 \text{ and } e_0 \text{ is given} \quad (14)$$

$$e_{min} \le e_k \le e_{max} \text{ for } k = 0 \quad (15)$$

$$h_k \ge 0 \text{ for } k = 0, \dots, -1 \quad (16)$$

$$0 \le u_{jk} \le 1 \text{ for } j = 1, \dots, k = 0, \dots, K\text{-}1 \quad (17)$$

The objective function in (11) is the weighted mean busy time (weighted according to message priority) and does not involve the variable $C_j$, so constraints (2) and (8) are not needed in model (P2). The message priority or weight $w_j$ may be assigned in an order from oldest to newest based on the amount of time messages have been waiting to be delivered. That is, older messages that have been waiting a long time for delivery are assigned higher priority than newer messages that have been waiting less time for delivery. Constraints (12) to (16) are the same as constraints (3) to (7). The binary decision variables $u_{jk}$ in constraint (9) are relaxed in constraint (17) to form a linear program (LP) instead of a binary linear program. This greatly improves the speed of calculation.

The optimization model (P2) is a standard LP with a very special structure. As demonstrated below, it is equivalent to a minimum cost network flow problem. This well-structured problem has very nice properties. In particular, if the input parameters $(s_{j,min}, e_{max}, e_0)$ are integer-valued, then the optimal solution $u_{jk}^*$ will also be integer-valued. This will assure a binary solution even though the binary constraint is relaxed in constraint (17). Another benefit to recognizing the network structure of (P2) is that there exist special-purpose algorithms for solving this type of problem very efficiently for a large scale.

Figure 6:
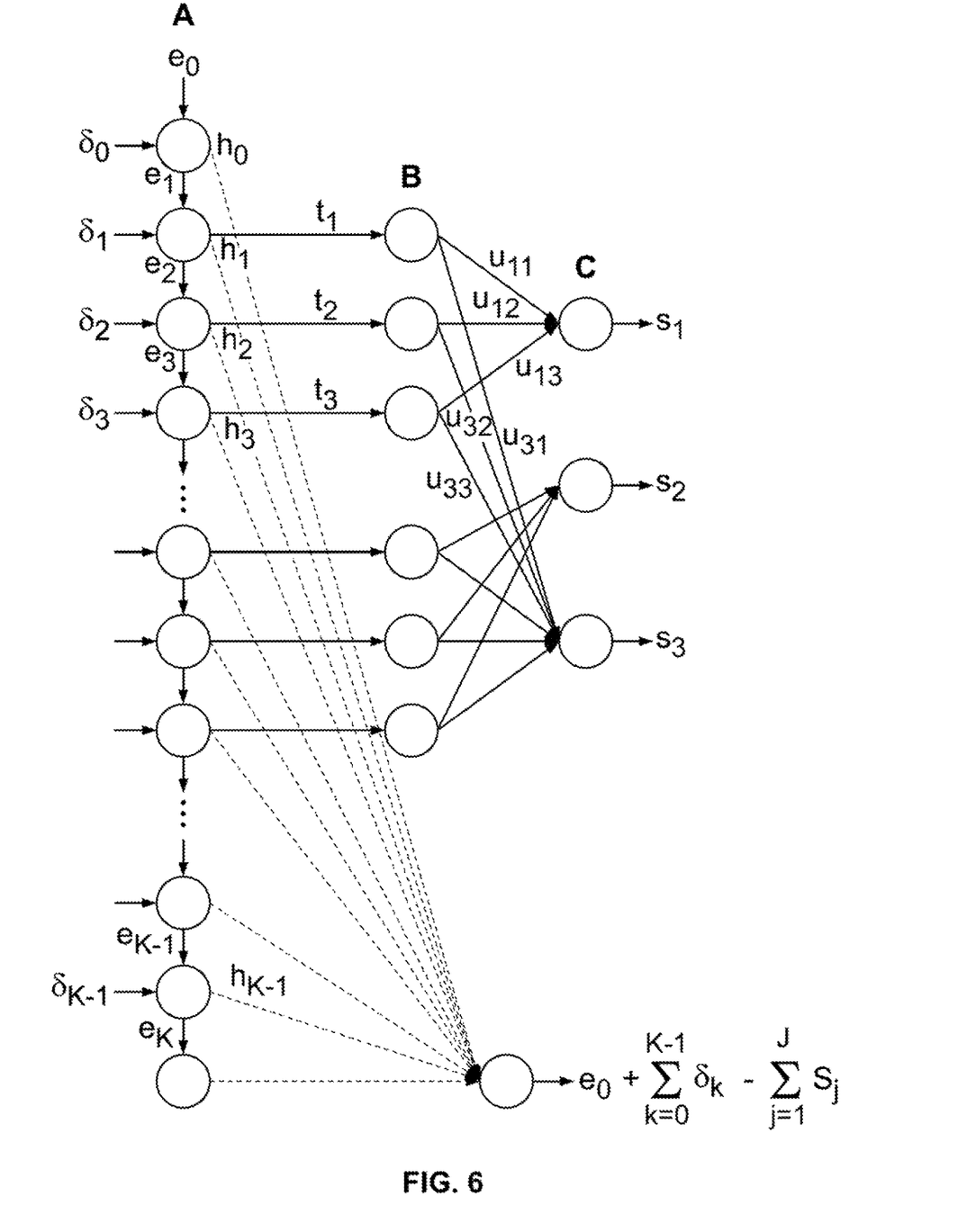
FIG. 6 illustrates a minimum cost network flow model with which a scheduling algorithm may be represented according to an illustrative embodiment.

Now to describe how (P2) can be represented as a minimum cost network flow problem, consider the network structure illustrated in FIG. 6. There are three types of nodes in the network. The nodes in the first column A represent time intervals, and the arcs entering those nodes indicate energy (in message units) entering the network during the k-th time interval. The flow conservation constraint equation (14) is associated with these nodes.

For example, as shown in FIG. 6, the second node in the first column A has arcs $\delta_1$ and $e_1$ entering the node representing energy inputs, and arcs $t_1$, $h_1$ and $e_2$ leaving the node representing energy output during the time interval $[\tau_1, \tau_2]$. Here, $t_k = \sum_{j=1}^{J} u_{jk}$ indicates a maximum of one unit of message transmitted during the k-th time interval.

As further shown in FIG. 6, the last node in the first column A is the terminal time node directing the excess energy supply to a demand node in the third column C to balance the total demand in the network. Upper and lower bounds on the flows in arcs $e_k$ are given in constraint (15). The flow constraint for each arc $t_k$ is given in (12). The non-negative flow constraint for arcs $h_k$ is given in (16).

The nodes in the second column B shown in FIG. 6 represent the unit time intervals for the contact time windows. The incoming arcs represent energy flows for transmitting at most one unit of message, and the outgoing arcs represent the specific messages that can be delivered in a contact time window. For example, the first node in the second column B has two possible messages (messages 1 and 3) that can be delivered in the time interval $[\tau_{1,2}]$, represented by arcs labeled $u_{11}$ and $u_{31}$. If a unit of message 1 is transmitted (i.e., $u_{11}=1$), then one unit of energy is expended. Constraints (12) and (17) limit the flows in arcs $u_{jk}$ to no more than one unit.

As further shown in FIG. 6, the nodes in the third column C represent the messages, and the outgoing arcs represent demands in terms of the message sizes, $s_j$ for $j=1, \dots, J$. Constraint (13) ensures the delivery of the complete message. The last node in the third column represents a balance constraint for the energy flow across the network. The sum of output flows is the initial energy $e_0$ plus the harvested energy from the sum $\Sigma_{k=0}^{K-1} \delta_k$ and is equal to the total energy entering the network.

The cost of a flow through arc $u_{jk}$ is given by $$\frac{wj}{sj}\left(\tau_k + \frac{1}{2}\right)$$

for $j=1, \dots, J$ and $k=0, \dots, K-1$. The flows in the rest of the arcs contribute zero costs. The objective is to find a feasible flow in the network of minimum cost. An important result in minimum cost flow problems, known as the integrality theorem, states that as long as the input data are integers, then there is an optimal solution to the linear program consisting of only integers. That is, the integer program can be solved by simply solving the linear program to obtain an optimal binary solution.

To illustrate the performance of the optimization model (P2), numerical simulations were conducted. The simulations included scenario data including contact time windows and solar charging time windows for a specified nanosat orbit and specified distributed ground station and user locations were generated using Systems Tool Kit® 11 (STK 11) by Analytical Graphics, Inc. (AGI). The scheduling algorithm simulation experiments for the generated data were performed using MATLAB® 2013a software. The linear programming model (P2) was solved using LP_Solve 5.5 software from MATLAB®.

Figure 7:
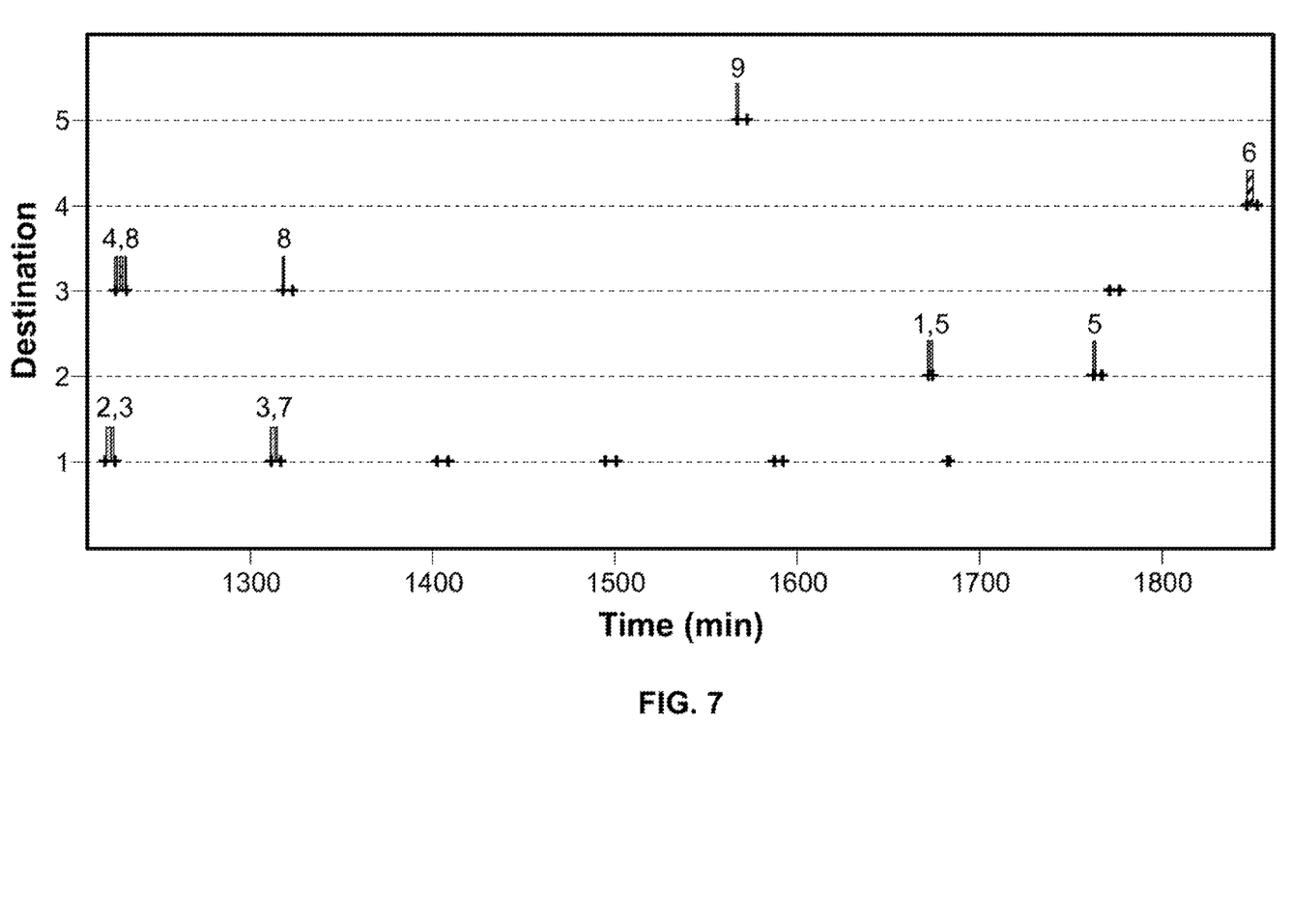
FIG. 7 illustrates a message delivery schedule using a highest priority rule strategy.
Figure 8:
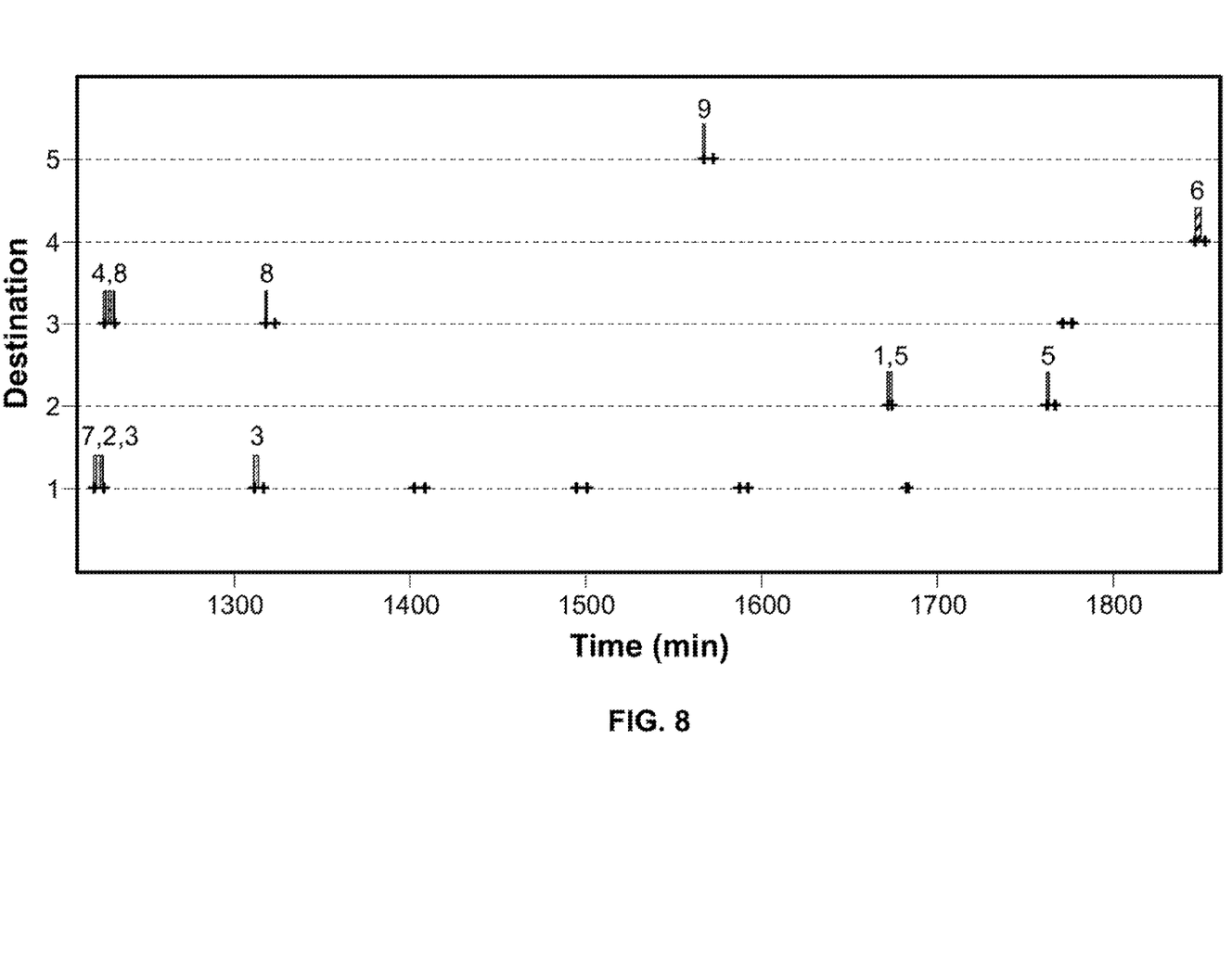
FIG. 8 illustrates a message delivery schedule using Smith's rule.
Figure 9:
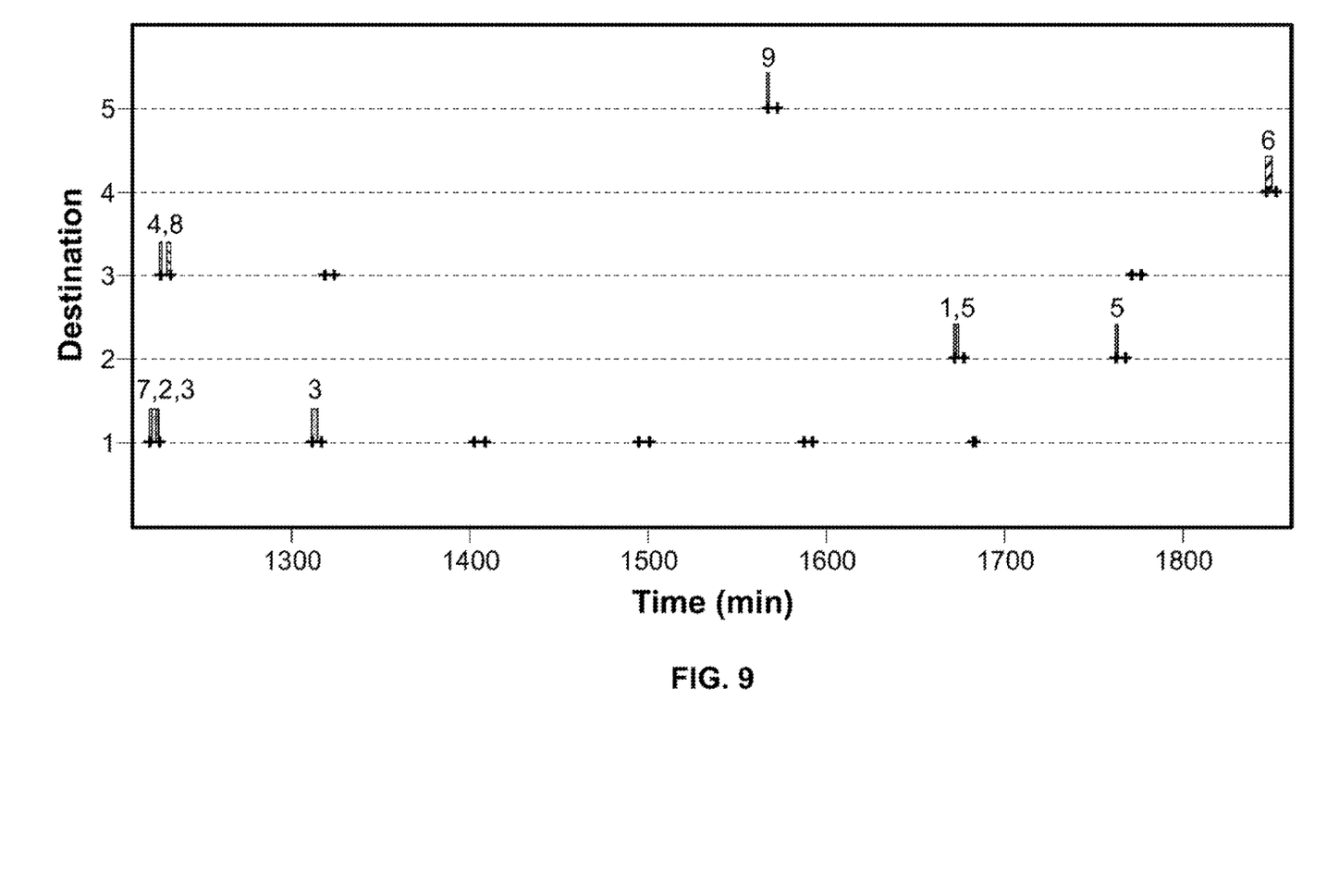
FIG. 9 illustrates a message delivery schedule using a weighted mean busy time strategy according to illustrative embodiments.

In the numerical simulations, a message delivery example with five (5) destinations and nine (9) messages of different sizes and priorities was created, which is referred to herein as Example 1. The schedules resulting from three different scheduling strategies are shown in FIGS. 7-9 which illustrate message delivery schedules for different destinations over different contact time windows. The three scheduling strategies examined for illustrative purposes included (1) highest priority rule, (2) Smith's rule, and (3) weighted mean busy time rule.

According to (1) the highest priority rule strategy, for each destination, messages are sorted according to their priorities. During a contact time window, associated messages are delivered according to the priority order, starting with the highest priority as long as energy and contact time window constraints are satisfied. When there is not enough energy during the current contact time window or the current contact time window is not long enough to transmit complete messages, the message delivery is continued in the next contact time window with the destination.

According to (2) Smith's rule, for each destination, messages are sorted according to their $w_j/s_j$ ratios. During a contact time window, associated messages are delivered according to the ratio order starting with the highest $w_j/s_j$ ratio. Energy and contact time window constraints are satisfied similarly as in the highest priority rule strategy.

According to (3) the weighed mean busy time rule strategy, this strategy involves solving the LP model (P2) to determine scheduling of messages.

A comparison of the effectiveness of these strategies is provided in FIGS. 7-9. FIG. 7 shows the message delivery scheduling using the highest priority result strategy for Example 1. FIG. 8 shows the message delivery schedule using Smith's rule strategy for Example 1. FIG. 9 shows the message delivery schedule using the weight mean busy time formulation (P2) strategy for Example 1. The numbers 1-9 in each of these figures identify the messages being delivered.

From FIGS. 7-9, it can be observed that the sequence of message delivery at destination 1 with the highest priority rule strategy is different from the sequences for message delivery at destination 1 with Smith's rule strategy and the (P2) strategy. The sequences remain the same at the rest of the destinations for the three strategies, except at destination 3. At destination 3, message 8 is delivered within one contact time window using the (P2) strategy, but two contact time windows with partial deliveries are needed to complete the delivery of message 8 with the highest priority rule strategy and Smith's rule strategy. This is because the (P2) strategy looks ahead at the energy requirement which results in better planning, compared with the other two greedy strategies. That is, during the first contact time window at destination 1, instead of expending all the available energy, the (P2) strategy reserves some energy for transmission in the next contact time window at destination 3. The other two greedy strategies utilize the entire contact time window to deliver message during the first contact time window, and hence not enough energy remains to complete message delivery in the next contact time window at destination 3. Because of limited contact time windows, messages 7,2,3 must be delivered over at least two contact windows at destination 1. However messages 4 and 8 can be delivered at destination 3 over one contact window if the satellite has enough energy to do so. The (P2) strategy considers contact windows, energy and message sizes and makes a smart decision to reserve some energy during the first contact window at destination 1, and therefore messages 4 and 8 are delivered over one contact window. Greedy methods need two contact time windows to deliver messages 4 and 8 because most of the available energy was used in the first contact time window, resulting in a significantly longer delivery time. When message delivery is not limited by energy, there is enough charging opportunity after message delivery at each contact window. This is the case for messages 1, 5, 6 and 9. In such a case, the same results are achieved with Smith's rule and (P2) strategies. The highest priority rule strategy also results in the same sequence for delivering messages 1, 5, 6 and 9 in Example 1, by coincidence.

As can be seen from a comparison of these figures, overall the (P2) strategy gains 87 minutes in total message delivery time compared with Smith's rule strategy and 179 minutes compared with the highest priority rule strategy. This simple example demonstrates the benefits of look-ahead planning especially when energy resource is limited. The performance of (P2) is superior to that of the other two greedy strategies.

Figure 10:
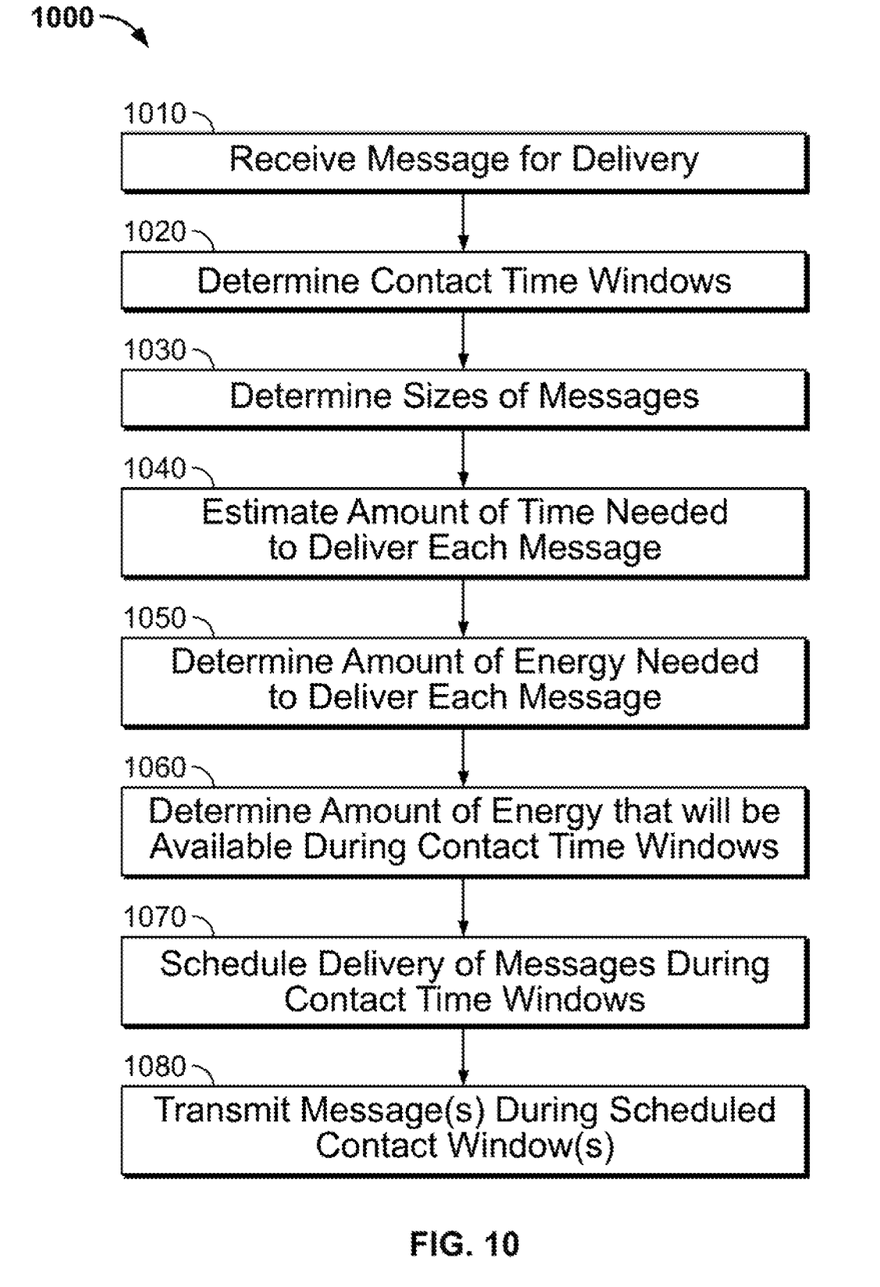
FIG. 10 is a flow chart illustrating the steps involved in a process for scheduling message delivery according to illustrative embodiments.

FIG. 10 is a flow chart illustrating the steps involved in a process 1000 for scheduling delivery of messages by a nanosat according to illustrative embodiments. It should be appreciated that the steps and order of steps described and illustrated are provided as examples. Fewer, additional, or alternative steps may also be involve in the fabrication of the shield, and/or some steps may occur in a different order.

Referring to FIG. 10, the process begins at step 1010 at which a transceiver of a nanosat receives a message, e.g., from a ground station. The message is intended for a ground recipient, e.g., a remote user device. This step is repeated for receipt of a plurality of messages received from a plurality of ground stations and intended for a plurality of respective ground recipients at different destinations. At step 1020, the nanosat determines contact time windows associated with the destinations of the ground recipients. This determination may be made, e.g., by a processor consulting data within a memory of the nanosat (show in FIG. 11 as described below). At step 1030, the nanosat determines the size of each of the messages, e.g., by the processor determining how many message units each message includes.

At step 1040, the nanosat estimates an amount of time needed to deliver each message based on the size of each message. This step may be performed by the processor determining a mean busy time for delivery of the message, as described above. At step 1050, the nanosat determines an amount of energy needed to deliver the message. This determination may be made by the processor based on the size of the message in terms of a number of predefined units of message size with the knowledge that the delivery of a predefined unit size of message consumes a corresponding predefined unit amount of energy That is, assuming the transmission power for a message unit is fixed, the energy consumed by transmitting a message having a given number of units equals the transmission power required to transmit the number of units multiplied by the transmission time.

At step 1060, the nanosat determines an amount of energy that will be available during the contact time windows associated with the destinations of the ground recipients. This determination may be made by the processor determining the current available capacity of a power source of the nanosat, the minimum energy capacity that must be maintained, and the maximum energy capacity that is available at any time. This determination may also be based on the charging time windows associated with the nanosatellite which indicates when energy will be harvested and will be available during the contact windows.

At step 1070, the nanosat schedules delivery of the messages during the contact windows based on the amount of energy that will be available during the contact windows and the amount of time needed to deliver each message, such that a total delivery time for all of the messages is minimized. This scheduling may be performed by the processor, according to the optimization model P2 described above. At step 1080, the messages are transmitted by the transceiver according to the delivery schedule.

FIG. 11 illustrates an example of a nanosat that schedules message delivery according to illustrative embodiments. Although no connections are shown between the components illustrated in FIG. 11, those skilled in the art will appreciate that the components can interact with each other via any suitable connections to carry out device functions.

The nanosat 1100 may include a processor 1102 for controlling and/or processing data. A memory 1104 can interface with the processor 1102 for the storage of data and/or applications 1106. The applications 1106 may include, for example, a program for scheduling message delivery using an optimization model, as described above. The data may include, for example, current battery power, charging time intervals, contact time windows associated with various destinations, a minimum battery power that must be maintained, a maximum battery capacity available at any time, data indicative of the "footprint" of the nanosat, the locations of destinations to which messages are to be delivered, a predefined message unit size and a corresponding predefined unit amount of power for delivery of a message unit, etc.

The applications 1106 can be instructions contained on computer-readable media, and may be stored in the memory 1106. The applications may, alternatively, be stored in firmware components 1108. The applications may be executed by the processor 1102. The applications may include programs for performing the process described above, including optimization of a schedule for delivery messages by the nanosatellite. The memory 1104 and/or firmware 1108 can also store code for execution during initialization of the device 1100.

A transceiver 1116 may interface with the processor 1102 to facilitate radio communication with the ground stations and remote user devices.

The device 1110 may also include a power source 1112, such as a solar-powered battery interfacing with solar panels 1114. The power source 1112 can interface with the processor 1102 to allow the processor to determine available battery power.

The scheduling scheme described above provides an autonomous message delivery scheduling system for satellites of all types (large, medium, mini, micro, nano, pico and femto). The proposed strategy accounts for message priorities, energy, and contact time windows to generate an optimal schedule.

Various embodiments of this invention are described herein. Variations of those embodiments may become apparent to those of ordinary skill in the art upon reading the foregoing description. For example, the invention may also be used by ground systems to guide satellite selection to relay data and messages to minimize delivery delay. The invention serves as a building block for a more complex online dynamic nanosat scheduling system and can be extended to account for network congestion and fairness among users. For example, the estimated delivery delays provided by this model could be utilized to identify congest paths in the network and to guide the nanosat selection for message forwarding which avoids congested paths. The fairness among users could be addressed by readjusting the priority weights of the message that have been in the queue for more than maximum message retention period.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method for scheduling delivery of a plurality of messages by a satellite, comprising:
    estimating, by a processor, an amount of time needed to deliver each of the plurality of messages received from a plurality of ground sources and intended for a plurality of ground recipients at respective different destinations based on a size of each of the messages, wherein each of the respective different destinations is associated with a contact time window during which the satellite will be in range of the ground recipients at that destination;
    determining, by the processor, an amount of energy that will be available from a power source for delivering the messages during each contact time window;
    scheduling, by the processor, delivery of the plurality of messages to the ground recipients based on the amount of energy that will be available for delivery of the messages during each contact time window and the amount of time needed to deliver each of the messages, such that a total time for delivery of the messages is minimized.

2. The method of claim 1, wherein estimating the amount of time needed to deliver each message includes calculating a mean busy time for delivery of each message.

3. The method of claim 2, wherein the mean busy time is an average point in time during which the message will be delivered.

4. The method of claim 1, wherein determining the amount of energy that will be available from the power source during each contact time window is based on a minimum amount of energy that must be maintained in the power source at any given time.

5. The method of claim 1, wherein determining an amount of energy that will be available from the power source during each contact time window is based on a maximum power storage capacity of the power source.

6. The method of claim 1, wherein determining an amount of energy that will be available from the power source during each contact time window is based on energy that will be harvested during charging time windows associated with the satellite during which the power source will be charged.

7. The method of claim 1, wherein the satellite also schedules delivery of the messages based on a priority assigned to each of the messages.

8. The method of claim 7, wherein the priority is assigned based on an amount of time a message has been waiting for delivery.

9. A satellite, comprising:
    a transceiver configured to receive a plurality of messages from a plurality of ground sources, wherein said messages are intended for a plurality of ground recipients at respective different destinations, and wherein each of the respective different destinations is associated with a contact time window during which the satellite will be in range of the ground recipients at that destination;
    a processor; and
    a memory having stored thereon instructions which, when executed by the processor, cause the processor to perform operations comprising:
        determining a size of each of the messages;
        estimating an amount of time needed to deliver each of the messages based on the size of each of the messages;
        determining an amount of energy that will be available from a power source for delivery of the messages during each contact window, wherein delivery of a predefined unit size of message consumes a corresponding predefined unit amount of energy; and
        optimizing a delivery schedule for delivering the plurality of messages to the ground recipients based on the amount of energy that will be available for delivery of the messages during each contact window and the amount of time needed to deliver each of the messages, such that a total time for delivery of the messages is minimized,
    wherein the transceiver transmits the plurality of messages according to the delivery schedule.

10. The satellite of claim 9, wherein estimating the amount of time needed to deliver each message includes calculating a mean busy time for delivery of each message.

11. The satellite of claim 10, wherein the mean busy time is an average point in time during which the message will be delivered.

12. The satellite of claim 9, wherein determining the amount of energy that will be available from the power source during each contact time window is based on a minimum amount of energy that must be maintained in the power source at any given time.

13. The satellite of claim 9, wherein determining an amount of energy that will be available from the power source during each contact time window is based on a maximum power storage capacity of the power source.

14. The satellite of claim 9, wherein determining an amount of energy that will be available from the power source during each contact window is based on energy that will be harvested during charging time windows associated with the satellite during which the power source will be charged.

15. The satellite of claim 14, wherein the charging time windows occur during intervals in which the nanosatellite is in contact with sunlight.

16. The satellite of claim 9, wherein the processor performs optimization of the delivery schedule of the messages based also on a priority assigned to each of the messages.

17. A device for scheduling delivery of a plurality of messages by a satellite, said messages intended for a plurality of ground recipients at respective different destinations, the device comprising:
a processor; and
a memory having stored thereon instructions which, when executed by the processor, cause the processor to perform operations comprising:
determining, for each of said respective different destinations, an associated contact time window during which the satellite will be within range of the ground recipients at that destination;
determining a size of each of the messages;
estimating an amount of time needed to deliver each message based on the size of each message according to a mean busy time function;
determining an amount of energy that will be available from a power source for delivery of the messages during each contact time window; and
scheduling delivery of the plurality of messages to the ground recipients based on the amount of energy that will be available for delivery of the messages during each contact time window and the of amount of time needed to deliver each of the messages, such that a total time for delivery of the messages is minimized.

18. The device of claim 17, wherein determining the amount of energy that will be available from the power source during each contact time window is based on a minimum amount of energy that must be maintained in the power source at any given time.

19. The device of claim 17, wherein determining the amount of energy that will be available from the power source during each contact time window is based on a maximum power storage capacity of the power source.

20. The device of claim 17, wherein determining the amount of energy that will be available from the power source during each contact time window is based on power that will be harvested during charging time windows associated with the satellite during which the power source will be charged.

* * * * *